US012006829B1

(12) United States Patent
Yamarthi et al.

(10) Patent No.: US 12,006,829 B1
(45) Date of Patent: Jun. 11, 2024

(54) SEAL MEMBER SUPPORT SYSTEM FOR A GAS TURBINE ENGINE

(71) Applicant: General Electric Company, Schenectady, NY (US)

(72) Inventors: David Raju Yamarthi, Bengaluru (IN); Ravindra Shankar Ganiger, Bengaluru (IN); Narendra Anand Hardikar, Bengaluru (IN); Rahul Anil Bidkar, Clifton Park, NY (US); Deepak Trivedi, Halfmoon, NY (US); Prateek Jalan, Bengaluru (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/317,229

(22) Filed: May 15, 2023

(30) Foreign Application Priority Data

Feb. 16, 2023 (IN) ............................. 202311010399

(51) Int. Cl.
*F01D 11/16* (2006.01)

(52) U.S. Cl.
CPC .......... *F01D 11/16* (2013.01); *F05D 2240/55* (2013.01); *F05D 2260/38* (2013.01)

(58) Field of Classification Search
CPC .......... F01D 11/14; F01D 11/22; F01D 11/16; F01D 11/02; F05D 2240/55; F05D 2260/38
See application file for complete search history.

(56) References Cited

U.S. PATENT DOCUMENTS 2,970,808 A 2/1961 Coppa
3,146,992 A 9/1964 Farrell
3,511,511 A 5/1970 Voitik
4,251,185 A 2/1981 Karstensen
4,307,993 A 12/1981 Hartel
4,334,822 A 6/1982 Rossmann
4,632,635 A 12/1986 Thoman et al.
4,747,603 A 5/1988 Sugino et al.
4,856,963 A 8/1989 Klapproth et al.
(Continued)

OTHER PUBLICATIONS

Chupp et al., Sealing in Turbomachinery, NASA/TM-2006-214341, National Aeronautics and Space Administration, Cleveland, OH, 2006, 62 Pages.

*Primary Examiner* — Brian P Wolcott
*Assistant Examiner* — Maxime M Adjagbe
(74) *Attorney, Agent, or Firm* — Dority & Manning, P.A.

(57) ABSTRACT

A turbomachine includes a rotor shaft having an outer surface, a seal carrier forming an annulus about the rotor shaft, and a seal member. The seal carrier at least partially defines a pressure chamber. The turbomachine further includes a seal member support system including a flex body having a contact portion in contact with the seal carrier, and a flex portion extending from the contact portion towards the outer surface of the rotor shaft. The flex portion is coupled to the seal member and is configured to hold the seal member at a radial distance away from the outer surface of the rotor shaft when a pressure inside the pressure chamber is equal to or below a minimum pressure threshold value, and to flex and move the seal member towards the outer surface of the rotor when the pressure inside the pressure chamber exceeds the minimum pressure threshold value.

19 Claims, 9 Drawing Sheets

(56) References Cited

U.S. PATENT DOCUMENTS

| | | | |
|---|---|---|---|
| 4,974,821 | A | 12/1990 | Balsells |
| 4,983,051 | A | 1/1991 | Hibner et al. |
| 5,100,158 | A | 3/1992 | Gardner |
| 5,143,384 | A | 9/1992 | Lipschitz |
| 5,301,957 | A | 4/1994 | Hwang et al. |
| 5,388,843 | A | 2/1995 | Sedy |
| 5,431,533 | A | 7/1995 | Hobbs |
| 5,509,664 | A | 4/1996 | Borkiewicz |
| 5,639,210 | A | 6/1997 | Carpenter et al. |
| 5,975,537 | A | 11/1999 | Turnquist et al. |
| 6,145,843 | A | 11/2000 | Hwang |
| 6,202,302 | B1 | 3/2001 | Descoteaux |
| 6,210,103 | B1 | 4/2001 | Ramsay |
| 6,273,671 | B1 | 8/2001 | Ress, Jr. |
| 6,368,054 | B1 | 4/2002 | Lucas |
| 6,505,837 | B1 | 1/2003 | Heshmat |
| 6,514,041 | B1 | 2/2003 | Matheny et al. |
| 6,543,992 | B2 | 4/2003 | Webster |
| 6,655,696 | B1 | 12/2003 | Fang et al. |
| 6,692,006 | B2 | 2/2004 | Holder |
| 6,811,154 | B2 | 11/2004 | Proctor et al. |
| 6,877,952 | B2 | 4/2005 | Wilson |
| 6,895,757 | B2 | 5/2005 | Mitchell et al. |
| 6,896,038 | B2 | 5/2005 | Arilla et al. |
| 7,066,470 | B2 | 6/2006 | Turnquist et al. |
| 7,079,957 | B2 | 7/2006 | Finnigan et al. |
| 7,086,649 | B2 | 8/2006 | Plona |
| 7,125,223 | B2 | 10/2006 | Turnquist et al. |
| 7,334,980 | B2 | 2/2008 | Trinks et al. |
| 7,367,776 | B2 | 5/2008 | Albers et al. |
| 7,435,049 | B2 | 10/2008 | Ghasripoor et al. |
| 7,438,526 | B2 | 10/2008 | Enderby |
| 7,448,849 | B1 | 11/2008 | Webster et al. |
| 7,459,081 | B2 | 12/2008 | Koenig et al. |
| 7,596,954 | B2 | 10/2009 | Penda et al. |
| 7,614,792 | B2 | 11/2009 | Wade et al. |
| 7,726,660 | B2 | 6/2010 | Datta |
| 7,752,849 | B2 | 7/2010 | Webster et al. |
| 7,901,186 | B2 | 3/2011 | Cornett et al. |
| 8,002,285 | B2 | 8/2011 | Justak |
| 8,047,765 | B2 | 11/2011 | Wilson et al. |
| 8,052,380 | B2 | 11/2011 | Willett, Jr. |
| 8,056,902 | B2 | 11/2011 | Roddis et al. |
| 8,113,771 | B2 | 2/2012 | Turnquist et al. |
| 8,142,141 | B2 | 3/2012 | Tesh et al. |
| 8,177,476 | B2 | 5/2012 | Andrew et al. |
| 8,186,945 | B2 | 5/2012 | Bhatnagar et al. |
| 8,210,799 | B1 | 7/2012 | Rawlings |
| 8,240,986 | B1 | 8/2012 | Ebert |
| 8,434,766 | B2 | 5/2013 | Zeng et al. |
| 8,556,578 | B1 | 10/2013 | Memmen et al. |
| 8,608,427 | B2 | 12/2013 | Bock |
| 8,641,045 | B2 | 2/2014 | Justak |
| 8,678,742 | B2 | 3/2014 | Klingels |
| 8,790,067 | B2 | 7/2014 | McCaffrey et al. |
| 8,864,443 | B2 | 10/2014 | Narita et al. |
| 8,985,938 | B2 | 3/2015 | Petty |
| 9,045,994 | B2 | 6/2015 | Bidkar et al. |
| 9,068,471 | B2 | 6/2015 | Klingels |
| 9,103,223 | B2 | 8/2015 | Uehara et al. |
| 9,115,810 | B2 | 8/2015 | Bidkar et al. |
| 9,145,785 | B2 | 9/2015 | Bidkar et al. |
| 9,169,741 | B2 | 10/2015 | Szwedowicz et al. |
| 9,200,530 | B2 | 12/2015 | McCaffrey |
| 9,255,489 | B2 | 2/2016 | DiTomasso et al. |
| 9,255,642 | B2 | 2/2016 | Bidkar et al. |
| 9,359,908 | B2 | 6/2016 | Bidkar et al. |
| 9,394,801 | B2 | 7/2016 | Willett, Jr. |
| 9,435,218 | B2 | 9/2016 | Casavant et al. |
| 9,528,554 | B2 | 12/2016 | Moratz |
| 9,587,746 | B2 | 3/2017 | Bidkar et al. |
| 9,598,971 | B2 | 3/2017 | Hasnedl et al. |
| 9,683,451 | B2 | 6/2017 | Sonokawa et al. |
| 9,869,196 | B2 | 1/2018 | Day et al. |
| 9,869,205 | B2 | 1/2018 | Ganiger et al. |
| 9,890,650 | B2 | 2/2018 | Von Berg et al. |
| 9,963,988 | B2 | 5/2018 | Swedowicz et al. |
| 9,976,435 | B2 | 5/2018 | Borja et al. |
| 10,041,534 | B2 | 8/2018 | Ganiger et al. |
| 10,060,280 | B2 | 8/2018 | Crawley, Jr. et al. |
| 10,077,782 | B2 | 9/2018 | Zhang et al. |
| 10,100,660 | B2 | 10/2018 | Sippel et al. |
| 10,161,259 | B2 | 12/2018 | Gibson et al. |
| 10,184,347 | B1 | 1/2019 | D'Ambruoso |
| 10,190,431 | B2 | 1/2019 | Bidkar et al. |
| 10,196,980 | B2 | 2/2019 | Ganiger et al. |
| 10,323,541 | B2 | 6/2019 | Ganiger et al. |
| 10,344,612 | B2 | 7/2019 | Hudson et al. |
| 10,352,455 | B2 | 7/2019 | Berard et al. |
| 10,385,715 | B2 | 8/2019 | Wong et al. |
| 10,415,418 | B2 | 9/2019 | McCaffrey et al. |
| 10,415,419 | B2 | 9/2019 | Sun et al. |
| 10,422,431 | B2 | 9/2019 | Chuong et al. |
| 10,436,070 | B2 | 10/2019 | McCaffrey |
| 10,443,424 | B2 | 10/2019 | McCaffrey |
| 10,533,446 | B2 | 1/2020 | Barak et al. |
| 10,920,593 | B2 | 2/2021 | Millier et al. |
| 10,962,024 | B2 | 3/2021 | Nesteroff et al. |
| 10,962,118 | B2 | 3/2021 | Duffy et al. |
| 10,995,861 | B2 | 5/2021 | Hilbert et al. |
| 11,047,481 | B2 | 6/2021 | Bidkar et al. |
| 11,111,805 | B2 * | 9/2021 | McCaffrey ............. F16J 15/442 |
| 11,193,590 | B2 | 12/2021 | Black |
| 2001/0007632 | A1 | 7/2001 | Pesek et al. |
| 2007/0053772 | A1 | 3/2007 | Couture, Jr. et al. |
| 2008/0056895 | A1 | 3/2008 | Senoo |
| 2008/0265513 | A1 | 10/2008 | Justak |
| 2010/0078893 | A1 | 4/2010 | Turnquist et al. |
| 2012/0177484 | A1 | 7/2012 | Lusted et al. |
| 2012/0211944 | A1 | 8/2012 | Nishimoto et al. |
| 2012/0223483 | A1 | 9/2012 | Bidkar et al. |
| 2012/0248704 | A1 | 10/2012 | Fennell et al. |
| 2013/0034423 | A1 | 2/2013 | Adaickalasamy et al. |
| 2014/0008871 | A1 | 1/2014 | Bidkar et al. |
| 2014/0062024 | A1 | 3/2014 | Bidkar et al. |
| 2014/0117624 | A1 | 5/2014 | Bidkar et al. |
| 2014/0119912 | A1 | 5/2014 | Bidkar et al. |
| 2015/0159498 | A1 | 6/2015 | Mukhopadhyay et al. |
| 2016/0010480 | A1 | 1/2016 | Bidkar et al. |
| 2016/0097291 | A1 | 4/2016 | Hayford et al. |
| 2016/0130963 | A1 | 5/2016 | Wilson et al. |
| 2016/0138412 | A1 | 5/2016 | Rioux |
| 2016/0348527 | A1 * | 12/2016 | Vetters .................. F01D 25/243 |
| 2016/0376907 | A1 | 12/2016 | O'Leary et al. |
| 2017/0051621 | A1 | 2/2017 | Ackermann et al. |
| 2017/0051834 | A1 | 2/2017 | Webster et al. |
| 2017/0211402 | A1 | 7/2017 | Peters et al. |
| 2018/0045066 | A1 | 2/2018 | Chuong |
| 2018/0058240 | A1 | 3/2018 | Chuong et al. |
| 2018/0372229 | A1 | 12/2018 | Bidkar et al. |
| 2019/0072186 | A1 | 3/2019 | Bidkar et al. |
| 2019/0085712 | A1 | 3/2019 | Wesling et al. |
| 2019/0203842 | A1 | 7/2019 | Bidkar et al. |
| 2019/0218926 | A1 | 7/2019 | DiFrancesco et al. |
| 2019/0276851 | A1 | 9/2019 | Lin |
| 2020/0040735 | A1 | 2/2020 | Millier et al. |
| 2020/0063588 | A1 | 2/2020 | Morliere et al. |
| 2020/0102845 | A1 | 4/2020 | DiFrancesco et al. |
| 2020/0165931 | A1 * | 5/2020 | McCaffrey ............ F01D 11/003 |
| 2020/0191162 | A1 | 6/2020 | Weihard et al. |
| 2020/0271006 | A1 * | 8/2020 | Wilson .................. F16J 15/442 |
| 2020/0318489 | A1 | 10/2020 | Webb |
| 2020/0362716 | A1 | 11/2020 | Glahn et al. |
| 2021/0207487 | A1 | 7/2021 | George et al. |
| 2022/0154580 | A1 | 5/2022 | Gainger et al. |
| 2022/0235667 | A1 | 7/2022 | Mizumi et al. |
| 2022/0349475 | A1 | 11/2022 | Nguyen et al. |

* cited by examiner

SEAL MEMBER SUPPORT SYSTEM FOR A GAS TURBINE ENGINE

PRIORITY INFORMATION

The present application claims priority to Indian Patent Application Serial Number 202311010399 filed on Feb. 16, 2023.

FIELD

The present disclosure relates to a gas turbine engine and, more particularly, to a seal member support system of the gas turbine engine.

BACKGROUND

Gas turbine engines, such as turbofan engines, may be used for aircraft propulsion. A turbofan engine generally includes a bypass fan section and a turbomachine such as a gas turbine engine to drive the bypass fan. The turbomachine generally includes a compressor section, a combustion section, and a turbine section in a serial flow arrangement. Both the compressor section and the turbine section are driven by one or more rotor shafts and generally include multiple rows or stages of rotor blades coupled to the rotor shaft. Each individual row of rotor blades is axially spaced from a successive row of rotor blades by a respective row of stator or stationary vanes. A radial gap is formed between an inner surface of the stator vanes and an outer surface of the rotor shaft.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

Figure 1:
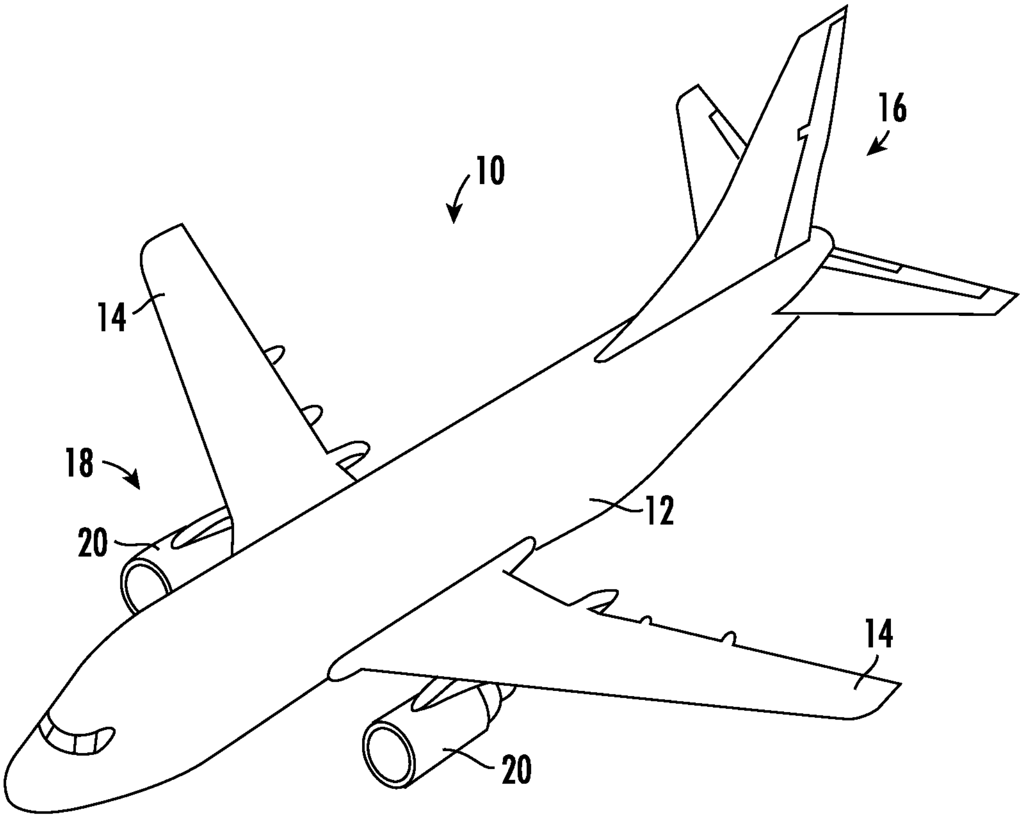
FIG. 1 is a perspective view of an exemplary aircraft in accordance with an exemplary aspect of the present disclosure.

Repeat use of reference characters in the present specification and drawings is intended to represent the same or analogous features or elements of the present disclosure.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary. The singular forms "a", "an", and "the" include plural references unless the context clearly dictates otherwise. The term "at least one of" in the context of, e.g., "at least one of A, B, and C" refers to only A, only B, only C, or any combination of A, B, and C.

As used herein, the terms "first", "second", and "third" may be used interchangeably to distinguish one component from another and are not intended to signify location or importance of the individual components. Furthermore, the terms "upstream" and "downstream" refer to the relative direction with respect to fluid flow in a fluid pathway. For example, "upstream" refers to the direction from which the fluid flows, and "downstream" refers to the direction to which the fluid flows.

The term "turbomachine" refers to a machine including one or more compressors, a heat generating section (e.g., a combustion section), and one or more turbines that together generate a torque output. The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The present disclosure is generally related to a seal member support system for a turbomachine of a gas turbine engine. A turbomachine generally includes a compressor section including a low-pressure compressor and a high-pressure compressor, a combustion section, and a turbine section including a high-pressure turbine and a low-pressure turbine arranged in serial-flow order. Each of the low-pressure compressor, the high-pressure compressor, the high-pressure turbine and the low-pressure turbine include sequential rows of stationary or stator vanes axially spaced by sequential rows of rotor blades. The rotor blades are generally coupled to a rotor shaft and the stator vanes are mounted circumferentially in a ring configuration about an outer surface of the rotor shaft. Radial gaps are formed between the outer surface of the rotor shaft and an inner portion of each ring or row of stator vanes.

During operation it is desirable to control (reduce or prevent) compressed air flow or combustion gas flow leakage through these radial gaps. Ring seals are used to form a film bearing seal to seal these radial gaps. Ring seals generally include a plurality of seal shoe or seal member segments. As pressure builds in the compressor section and/or the turbine section, the seal members are forced radially outwardly and form a bearing seal between the outer surface of the rotor shaft and the respective seal members. To reduce wear on the rotor shaft and/or the seal members, it is desirable to maintain a positive radial clearance between the seal members and the outer surface of the rotor shaft under all operating conditions of the turbomachine. However, at low delta pressure operating conditions and transients like during start-up, stall, rotor vibration events, or during sudden pressure surges within the turbomachine, the film bearing stiffness may be low or suddenly change thus leading to seal member/rotor rubs.

Disclosed herein is a seal member support system to hold the seal members in a retracted position radially away from the rotor shaft during these low delta pressure operating conditions. Various embodiments presented work on a tangential spring-based retraction mechanism. In an assembly or low-pressure condition, the seal members are held in the retracted position, radially outward from the outer surface of the rotor shaft. As a pressure delta across a backside surface of the seal members increases, the seal members/segments move radially inwardly to a desired radial position to seal the respective radial gap (e.g. the seal rides on an air film). As the pressure delta across the seal members decreases, the seal members return to the retracted condition, thus reducing the potential for rotor scrub and damage or excessive wear to the seal members.

Referring now to the drawings, FIG. 1 is a perspective view of an exemplary aircraft 10 that may incorporate at least one exemplary embodiment of the present disclosure. As shown in FIG. 1, the aircraft 10 has a fuselage 12, wing(s) 14 attached to the fuselage 12, and an empennage 16. The aircraft 10 further includes a propulsion system 18 that produces a propulsive thrust to propel the aircraft 10 in flight, during taxiing operations, etc. Although the propulsion system 18 is shown attached to the wing(s) 14, in other embodiments it may additionally or alternatively include one or more aspects coupled to other parts of the aircraft 10, such as, for example, the empennage 16, the fuselage 12, or both. The propulsion system 18 includes at least one engine. In the exemplary embodiment shown, the aircraft 10 includes a pair of gas turbine engines 20. Each gas turbine engine 20 is mounted to the aircraft 10 in an under-wing configuration. Each gas turbine engine 20 is capable of selectively generating a propulsive thrust for the aircraft 10. The gas turbine engines 20 may be configured to burn various forms of fuel including, but not limited to unless otherwise provided, jet fuel/aviation turbine fuel, and hydrogen fuel.

Figure 2:
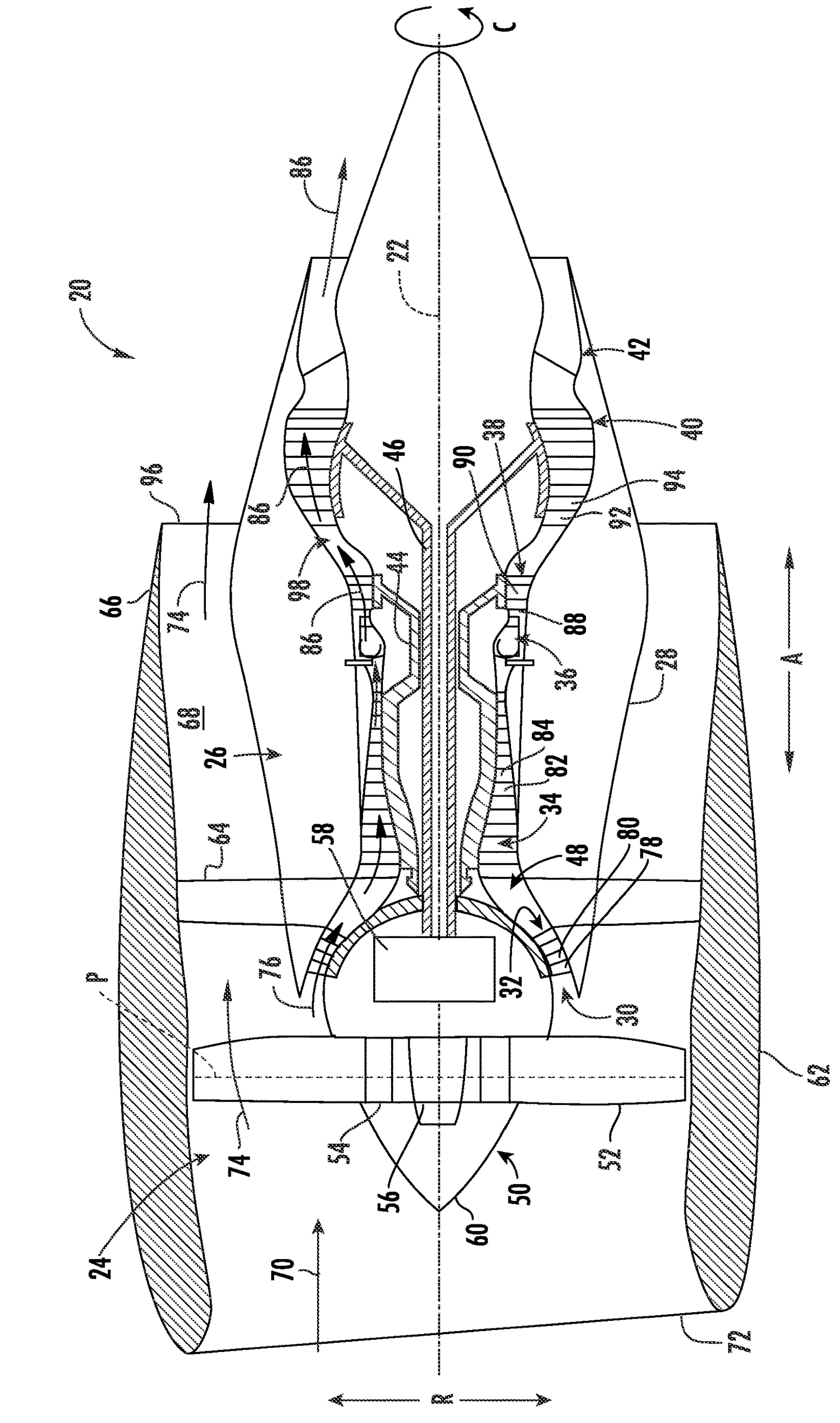
FIG. 2 is a cross-sectional view of an exemplary gas turbine engine in accordance with an exemplary aspect of the present disclosure.

FIG. 2 is a cross-sectional side view of a gas turbine engine 20 in accordance with an exemplary embodiment of the present disclosure. More particularly, for the embodiment of FIG. 2, the gas turbine engine 20 is a multi-spool, high-bypass turbofan jet engine, sometimes also referred to as a "turbofan engine." As shown in FIG. 2, the gas turbine engine 20 defines an axial direction A (extending parallel to a longitudinal centerline 22 provided for reference), a radial direction R, and a circumferential direction C extending about the longitudinal centerline 22. In general, the gas turbine engine 20 includes a fan section 24 and a turbomachine 26 disposed downstream from the fan section 24.

The exemplary turbomachine 26 depicted generally includes an outer casing 28 that defines an annular core inlet 30. The outer casing 28 at least partially encases, in serial flow relationship, an axial compressor section including a booster or low-pressure (LP) compressor 32 and a high-pressure (HP) compressor 34, a combustion section 36, a turbine section including a high-pressure (HP) turbine 38 and a low-pressure (LP) turbine 40, and a jet exhaust nozzle 42.

A high-pressure (HP) rotor shaft 44 drivingly connects the HP turbine 38 to the HP compressor 34. A low-pressure (LP) rotor shaft 46 drivingly connects the LP turbine 40 to the LP compressor 32. The LP compressor 32, the HP compressor 34, the combustion section 36, the HP turbine 38, the LP turbine 40, and the jet exhaust nozzle 42 together define a working gas flow path 48 through the gas turbine engine 20.

For the embodiment depicted, the fan section 24 includes a fan 50 having a plurality of fan blades 52 coupled to a disk 54 in a spaced apart manner. As depicted, the fan blades 52 extend outwardly from disk 54 generally along the radial direction R. Each fan blade 52 is rotatable with the disk 54 about a pitch axis P by virtue of the fan blades 52 being operatively coupled to a suitable pitch change mechanism 56 configured to collectively vary the pitch of the fan blades 52, e.g., in unison.

The gas turbine engine 20 further includes a power gear box 58. The fan blades 52, disk 54, and pitch change mechanism 56 are together rotatable about the longitudinal centerline 22 by the LP rotor shaft 46 across the power gear box 58. The power gear box 58 includes a plurality of gears for adjusting a rotational speed of the fan 50 relative to a rotational speed of the LP rotor shaft 46, such that the fan 50 and the LP rotor shaft 46 may rotate at more efficient relative speeds.

Referring still to the exemplary embodiment of FIG. 2, the disk 54 is covered by a rotatable front hub 60 of the fan section 24 (sometimes also referred to as a "spinner"). The rotatable front hub 60 is aerodynamically contoured to promote an airflow through the plurality of fan blades 52. Additionally, the exemplary fan section 24 includes an annular fan casing or outer nacelle 62 that circumferentially surrounds the fan 50 and/or at least a portion of the turbomachine 26. The outer nacelle 62 is supported relative to the turbomachine 26 by a plurality of circumferentially spaced struts or outlet guide vanes 64 in the embodiment depicted. Moreover, a downstream section 66 of the outer nacelle 62 extends over an outer portion of the turbomachine 26 to define a bypass airflow passage 68 therebetween.

It should be appreciated, however, that the exemplary gas turbine engine 20 depicted in FIG. 2 is provided by way of example only, and that in other exemplary embodiments, the gas turbine engine 20 may have other configurations. For example, although the gas turbine engine 20 depicted is configured as a ducted gas turbine engine (e.g., including the outer nacelle 62), in other embodiments, the gas turbine engine 20 may be an unducted or non-ducted gas turbine engine (such that the fan 50 is an unducted fan, and the outlet guide vanes 64 are cantilevered from the outer casing 28). In other embodiments, the propulsion system may comprise of an electric or hybrid engine substituted for the gas turbine engine shown and described.

Additionally, or alternatively, although the gas turbine engine 20 depicted is configured as a geared gas turbine engine (e.g., including the power gear box 58) and a variable pitch gas turbine engine (e.g., including a fan 50 configured as a variable pitch fan), in other embodiments, the gas turbine engine 20 may be configured as a direct drive gas turbine engine (such that the LP rotor shaft 46 rotates at the same speed as the fan 50), as a fixed pitch gas turbine engine (such that the fan 50 includes fan blades 52 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

During operation of the gas turbine engine 20, a volume of air 70 enters the gas turbine engine 20 through an associated inlet 72 of the outer nacelle 62 and fan section 24. As the volume of air 70 passes across the fan blades 52, a first portion of air 74 is directed or routed into the bypass airflow passage 68 and a second portion of air 76 is directed or routed into the working gas flow path 48, or more specifically into the LP compressor 32. The ratio between the first portion of air 74 and the second portion of air 76 is commonly known as a bypass ratio.

As the second portion of air 76 enters the LP compressor 32, one or more sequential stages of low-pressure (LP) compressor stator vanes 78 and low-pressure (LP) compressor rotor blades 80 coupled to the LP rotor shaft 46 progressively compress the second portion of air 76 flowing through the LP compressor 32 enroute to the HP compressor 34. Next, one or more sequential stages of high-pressure (HP) compressor stator vanes 82 and high-pressure (HP) compressor rotor blades 84 coupled to the HP rotor shaft 44 further compress the second portion of air 76 flowing through the HP compressor 34. This provides compressed air to the combustion section 36 where it mixes with fuel and burns to provide combustion gases 86.

The combustion gases 86 are routed through the HP turbine 38 where a portion of thermal and/or kinetic energy from the combustion gases 86 is extracted via sequential stages of high-pressure (HP) turbine stator vanes 88 that are coupled to a turbine casing and high-pressure (HP) turbine rotor blades 90 that are coupled to the HP rotor shaft 44, thus causing the HP rotor shaft 44 to rotate, thereby supporting operation of the HP compressor 34. The combustion gases 86 are then routed through the LP turbine 40 where a second portion of thermal and kinetic energy is extracted from the combustion gases 86 via sequential stages of low-pressure (LP) turbine stator vanes 92 that are coupled to a turbine casing and low-pressure (LP) turbine rotor blades 94 that are coupled to the LP rotor shaft 46, thus causing the LP rotor shaft 46 to rotate, and thereby supporting operation of the LP compressor 32 and/or rotation of the fan 50.

The combustion gases 86 are subsequently routed through the jet exhaust nozzle 42 of the turbomachine 26 to provide propulsive thrust. Simultaneously, the pressure of the first portion of air 74 is substantially increased as it is routed through the bypass airflow passage 68 before it is exhausted from a fan nozzle exhaust section 96 of the gas turbine engine 20, also providing propulsive thrust. The HP turbine 38, the LP turbine 40, and the jet exhaust nozzle 42 at least partially define a hot gas path 98 for routing the combustion gases 86 through the turbomachine 26.

Figure 3:
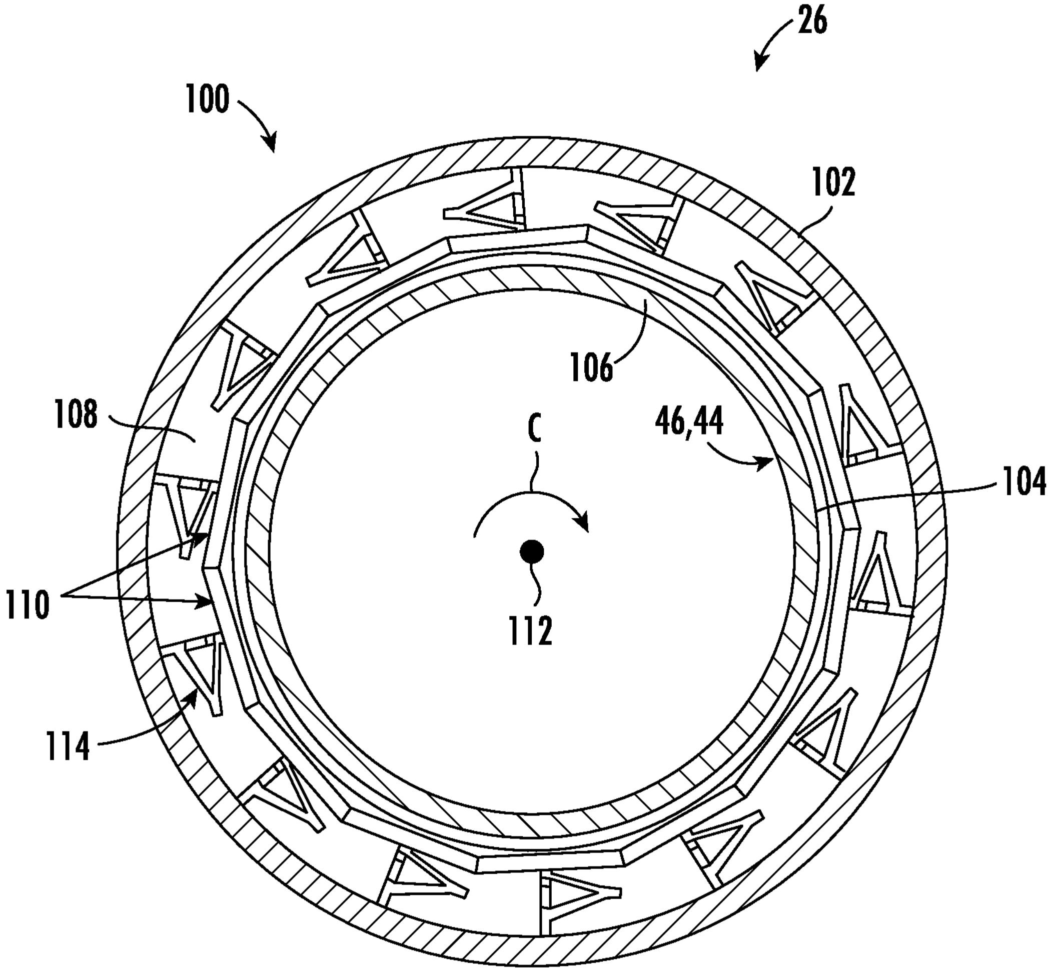
FIG. 3 is a cross-sectioned schematic view of a portion of a turbomachine of the gas turbine engine shown in FIG. 2, in accordance with an exemplary aspect of the present disclosure.

FIG. 3 provides a cross-sectioned schematic view of a portion of the turbomachine 26 of the gas turbine engine 20 shown in FIG. 2, according to exemplary embodiments of the present disclosure. FIG. 3 may be a representative cross-section of any of the LP compressor 32, the HP compressor 34, the HP turbine 38, or the LP turbine 40. As shown in FIG. 3, the turbomachine 26 includes a seal member support system 100 referred to hereafter as "support system". The support system 100 includes a seal carrier 102 forming an annulus about an outer surface 104 of a rotor shaft 106. It is to be appreciated that the rotor shaft 106 illustrated in FIG. 3 may be representative of the LP rotor shaft 46 or the HP rotor shaft 44 shown in FIG. 2. The seal carrier 102 at least partially defines a pressure chamber 108 within the turbomachine 26. It is to be noted that the seal carrier 102 may be disposed between the outer surface 104 of the rotor shaft 106 and an inner surface of a respective row of stationary vanes such as the LP compressor stator vanes 78, the HP compressor stator vanes 82, the HP turbine stator vanes 88 or the LP turbine stator vanes 92 as shown in FIG. 2.

As shown in FIG. 3, the support system 100 includes a plurality of seal members 110 dispersed/arranged circumferentially about the rotor shaft 106 with respect to an axial centerline 112 of the rotor shaft 106 in circumferential direction C. The support system 100 further includes a plurality of flex bodies 114 dispersed or arranged circumferentially about the rotor shaft 106 with respect to the axial centerline 112 of the rotor shaft 106. In various embodiments, as shown in FIG. 3, the plurality of flex bodies 114 is oriented circumferentially about the axial centerline 112 of the rotor shaft 106. Each seal member 110 of the plurality of seal members 110 is coupled to at least one flex body 114 of the plurality of flex bodies 114.

Figure 4:
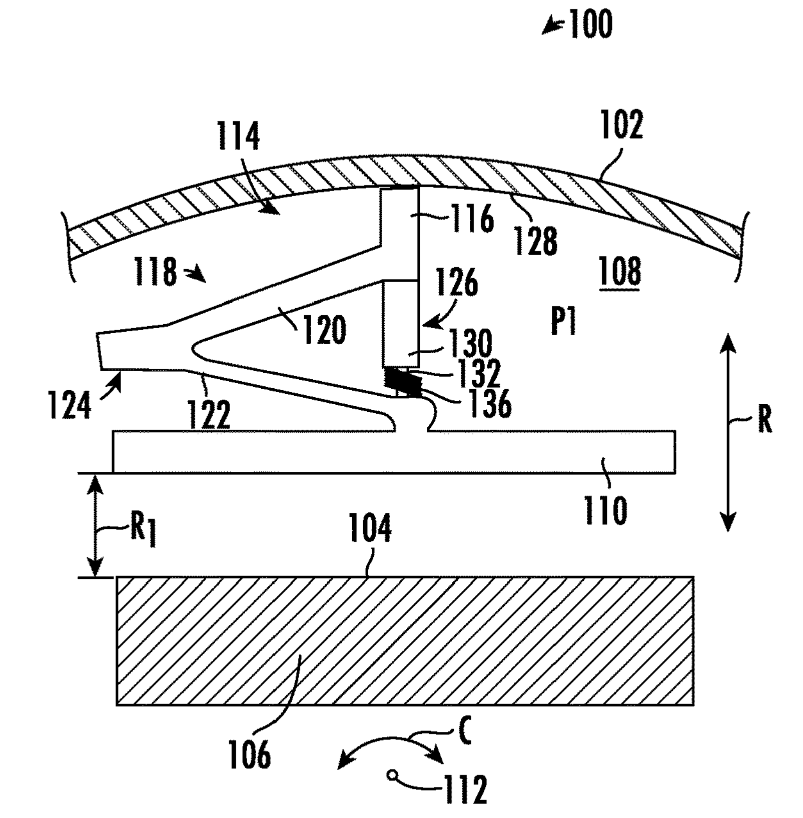
FIG. 4 is a cross-sectioned schematic view of a portion of a seal member support system in a retracted or initial operational condition in accordance with an exemplary aspect of the present disclosure.
Figure 5:
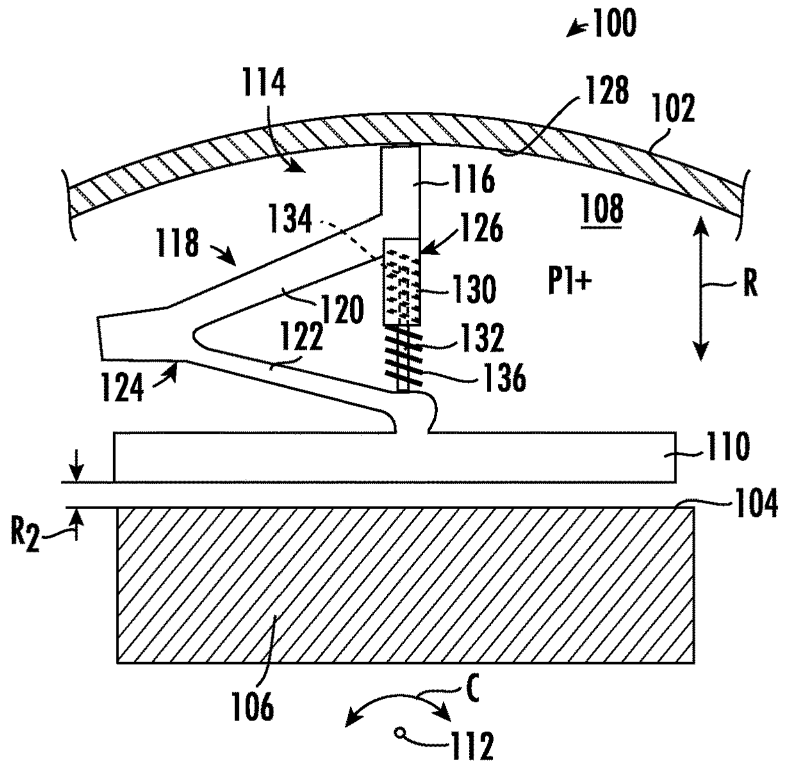
FIG. 5 provides a cross-sectioned schematic view of the seal member support system as shown in FIG. 4, in an extended operational condition, in accordance with an exemplary aspect of the present disclosure.

FIG. 4 provides a cross-sectioned schematic view of a portion of the support system 100 including a portion of the seal carrier 102, a portion of the rotor shaft 106, and including an exemplary flex body 114 of the plurality of flex bodies 114, as shown in FIG. 3, in a retracted or initial operational condition. FIG. 5 provides a cross-sectioned schematic view of a portion of the seal carrier 102 and a portion of the rotor shaft 106 including the exemplary flex body 114, as shown in FIG. 4, in an extended operational condition, according to exemplary embodiments of the present disclosure.

As shown in FIGS. 4 and 5, the flex body 114 includes a contact portion 116 in contact with the seal carrier 102, and a flex portion 118 extending in both the circumferential direction C and radial direction R with respect to the axial centerline 112 of the rotor shaft 106. Contact portion 116 may be rigidly connected to or slidably contacting an inner surface 128 of the seal carrier 102.

As shown in FIG. 4, the flex portion 118 defines a resistance along radial direction R of the turbomachine and is configured to hold the seal member 110 at a first radial distance R1 away from the outer surface 104 of the rotor shaft 106 when a pressure inside the pressure chamber 108 is equal to or below a minimum pressure threshold value P1. When the pressure inside the pressure chamber 108 exceeds the minimum pressure threshold value P1 (indicated as P1+ in FIG. 5) the flex portion 118 deforms radially inward in radial direction R, thus moving the seal member 110 towards the outer surface 104 of the rotor shaft 106. It is to be appreciated that the flex portion 118 may also deform radially inward with respect to radial direction R thus moving the seal member 110 towards the outer surface 104 of the rotor shaft 106 to a second radial distance R2 from the outer surface 104 in response to an increase in temperature inside the pressure chamber 108. In addition, the flex portion 118 may contract radially outwardly with respect to radial direction R, thus moving the seal member 110 away from the outer surface 104 of the rotor shaft 106 in response to a decrease in temperature inside the pressure chamber 108.

As shown in FIGS. 4 and 5, the flex portion 118 includes at least one spring arm or beam. In particular embodiments, the flex portion 118 includes a first beam 120 and a second beam 122. The first beam 120 and the second beam 122 are arranged in a "V" configuration to form a first wishbone flex member 124. In this embodiment, the seal member 110 is coupled to the second beam 122. First beam 120 extends toward the rotor shaft 106 at an angle that is tangent to the outer surface 104 of the rotor shaft 106.

In various embodiments, as shown in FIGS. 4 and 5, the support system 100 further comprises a damping system 126. Generally, the damping system 126 is disposed between an inner surface 128 of the seal carrier 102 and the seal member 110. In the embodiments illustrated in FIGS. 4 and 5, the damping system 126 is disposed between the contact portion 116 and the seal member 110. The damping system 126 includes a stopper or sleeve 130. In particular embodiments, the stopper or sleeve 130 may be formed from a bi-metallic material. In this configuration, the stopper or sleeve 130 may grow or contract radially thus moving the seal member 110 accordingly in response to an increase or decrease in temperature within the pressure chamber 108.

In particular embodiments, a shaft or piston 132 extends from the stopper or sleeve 130 and is in contact with the seal member 110. As shown in hidden lines in FIG. 5, a spring or other suitable damping member 134 may be disposed within and/or supported by the stopper or sleeve 130 to provide a damping effect to the shaft or piston 132. For example, such as when the flex portion 118 begins to retract as the pressure inside the pressure chamber 108 returns to a level at or below the minimum pressure threshold value P1 or when the seal member 110 is suddenly forced radially outwardly due to rotor shaft vibrations or a sudden surge in pressure between the outer surface 104 of the rotor shaft 106 and the seal member 110. This damping effect reduces the potential for damage to the seal member 110.

In exemplary embodiments, the damping system 126 may further include a spring 136 that extends helically about the shaft or piston 132. The spring 136 is configured to slow radially outward motion of the seal member 110. The spring 136 provides additional damping to the seal member 110. The spring 136 may have a stiffness that greater than or less than a stiffness provided by the shaft or piston 132. In exemplary embodiments, the damping system includes a shape memory alloy in addition to or in the alternative to the spring 136. The shape memory alloy expands or contracts in response to temperature changes to limit maximum radial movement of the seal carrier 102.

Figure 6:
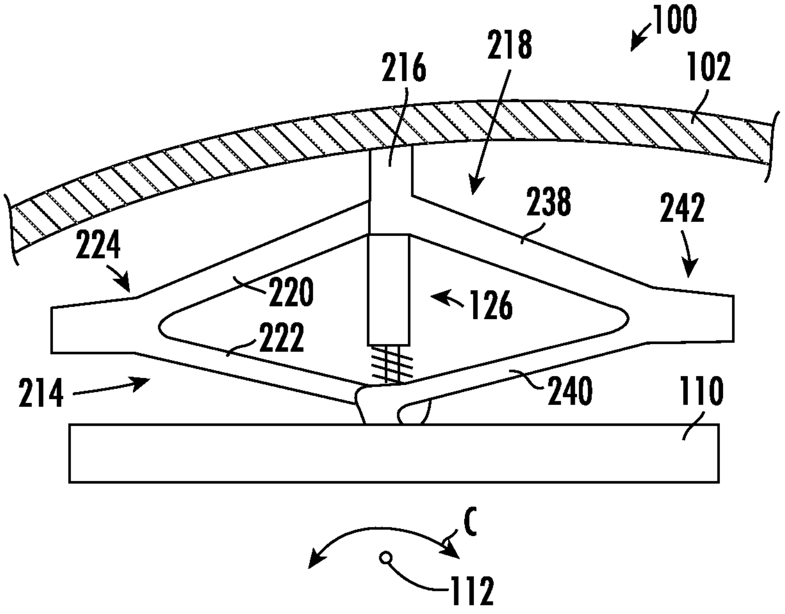
FIG. 6 is a cross-sectioned schematic view of a portion of a seal member support system including a portion of a seal carrier and including an exemplary flex body in accordance with an exemplary aspect of the present disclosure.

FIG. 6 provides a cross-sectioned schematic view of a portion of the support system 100 including a portion of the seal carrier 102 and including an exemplary flex body 214 in accordance with various embodiments of the present disclosure. In particular embodiments, as shown in FIG. 6, flex body 214 includes flex portion 218 having a first beam 220, and a second beam 222 arranged in a "V" configuration about axial centerline 112 of the rotor shaft 106 (FIG. 3) to form a first wishbone flex member 224. First beam 220 extends toward the rotor shaft 106 at an angle that is tangent to the outer surface 104 of the rotor shaft 106. Second Beam 222 extends towards the rotor shaft 106 at an angle that is tangent to the outer surface 104 of the rotor shaft 106. First beam 220 and second beam 222 may extend in circumferentially opposite directions with respect to circumferential direction C.

The flex portion 218 further includes a third beam 238 and a fourth beam 240 arranged in a "V" configuration to form a second wishbone flex member 242. third beam 238 extends toward the rotor shaft 106 at an angle that is tangent to the outer surface 104 of the rotor shaft 106. Fourth beam 240 extends towards the rotor shaft 106 at an angle that is tangent to the outer surface 104 of the rotor shaft 106. Third beam 238 and fourth beam 240 may extend in circumferentially opposite directions with respect to circumferential direction C.

As shown in FIG. 6, the third beam 238 and the fourth beam 240 of the second wishbone flex member 242 are oriented opposite (in the circumferential direction C) to the first beam 220 and the second beam 222 of the first wishbone flex member 224. The damping system 126 is disposed between contact portion 216 and the seal member 110.

Figure 7:
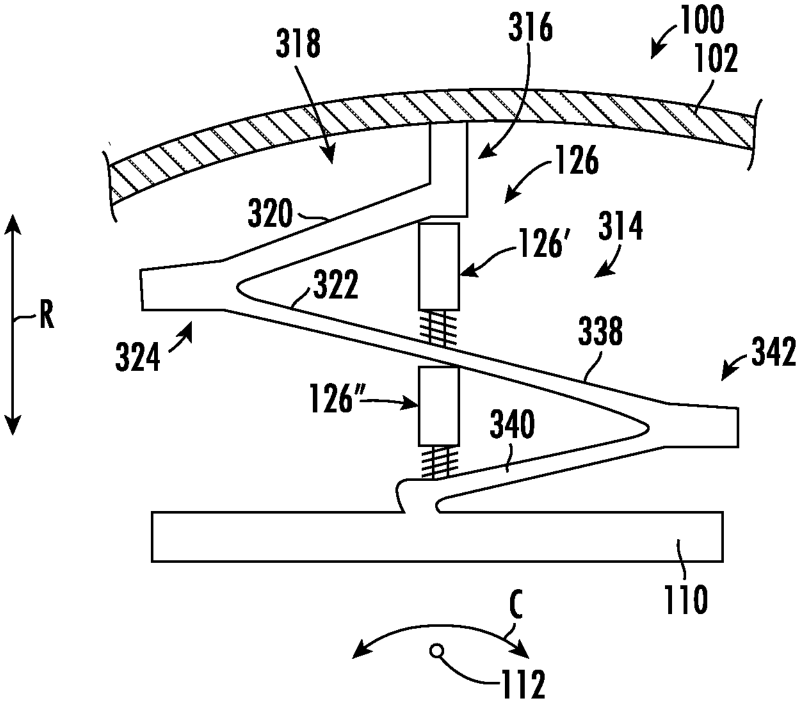
FIG. 7 is a cross-sectioned schematic view of a portion of a seal member support system including a portion of a seal carrier and an exemplary flex body in accordance with an exemplary aspect of the present disclosure.

FIG. 7 provides a cross-sectioned schematic view of a portion of the support system 100 including a portion of the seal carrier 102 and including an exemplary flex body 314 in accordance with various embodiments of the present disclosure. In particular embodiments, as shown in FIG. 7, flex portion 318 of the flex body 314 includes a first beam 320 and a second beam 322 arranged in a "V" configuration about axial centerline 112 of the rotor shaft 106 (FIG. 3) to form first wishbone flex member 324. First beam 320 extends toward the rotor shaft 106 at an angle that is tangent to the outer surface 104 of the rotor shaft 106. Second Beam 322 extends towards the rotor shaft 106 at an angle that is tangent to the outer surface 104 of the rotor shaft 106. First beam 320 and second beam 322 may extend in circumferentially opposite directions with respect to circumferential direction C.

The flex portion 318 further includes a third beam 338 and a fourth beam 340 arranged in a "V" configuration to form a second wishbone flex member 342. Third beam 338 extends tangentially from contact portion 316 towards the outer surface 104 of the rotor shaft 106 at an angle that is tangent to the outer surface 104 of the rotor shaft 106. In particular embodiments the angle is equal to or greater than 5 degrees and less than or equal to 85 degrees. The second and third beams 322, 338 may be formed as a single beam.

As shown in FIG. 7, the third beam 338 and the fourth beam 340 of the second wishbone flex member 342 are oriented opposite (in the circumferential direction C) to the first beam 320 and the second beam 322 of the first wishbone flex member 324. In this embodiment, the first wishbone flex member 324 and the second wishbone flex member 342 are radially stacked with respect to radial direction R between the seal member 110 and the seal carrier 102.

In exemplary embodiments, as shown in FIG. 7, the damping system 126 includes a first damping system 126' disposed between contact portion 316 and the second beam 322, and a second damping system 126" disposed between the third beam 338 and the seal member 110. In other words, the first damping system 126' and the second damping system 126" are radially stacked with respect to radial direction R between the seal member 110 and the seal carrier 102. The first damping system 126' and the second damping system 126" may be configured to provide different stiffnesses. For example, stiffness provided by the second damping system 126" may be greater than or less than stiffness provided by the first damping system 126'.

Figure 8:
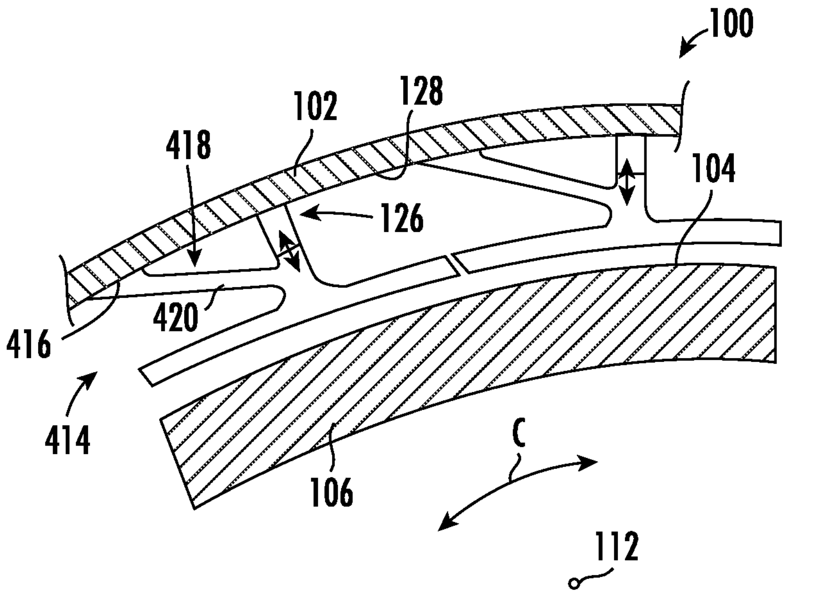
FIG. 8 is a cross-sectioned schematic view of a portion of a seal member support system including a portion of a seal carrier and a pair of exemplary flex bodies in accordance with an exemplary aspect of the present disclosure.

FIG. 8 provides a cross-sectioned schematic view of a portion of the support system 100 including a portion of the seal carrier 102 and including a pair of exemplary flex bodies 414 in accordance with various embodiments of the present disclosure. In particular embodiments, as shown in FIG. 8, flex portion 418 of flex body 414 includes a single beam 420 in contact with the inner surface 128 at contact point 416. The single beam 420 extends about axial centerline 112 of the rotor shaft 106 (FIG. 3) in circumferential direction C toward the rotor shaft 106 at an angle that is tangential to the outer surface 104 of the rotor shaft 106. In the exemplary embodiment shown in FIG. 8, the damping system 126 is disposed between the inner surface 128 of the seal carrier 102 and the seal member 110.

Figure 9:
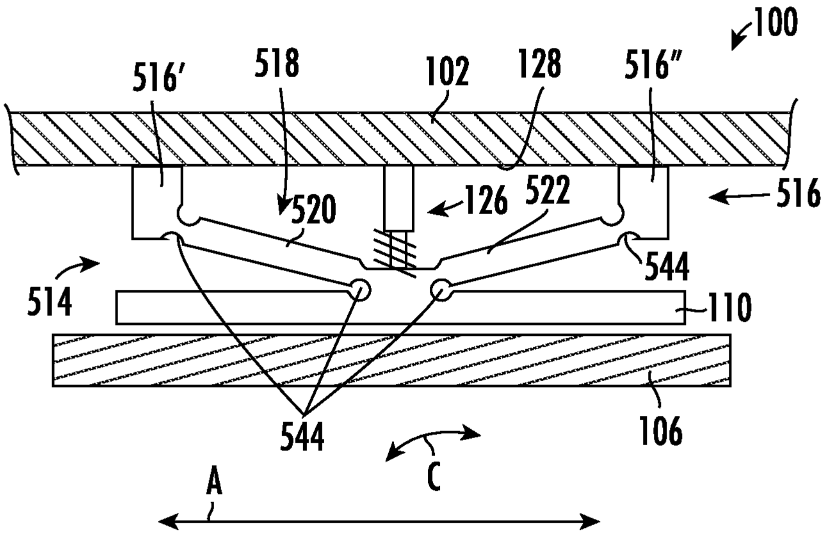
FIG. 9 is a cross-sectioned schematic view of a portion of a seal member support system including a portion of a seal carrier and an exemplary flex body in accordance with an exemplary aspect of the present disclosure.

FIG. 9 provides a cross-sectioned schematic view of a portion of the support system 100 including a portion of the seal carrier 102 and including an exemplary flex body 514 in accordance with various embodiments of the present disclosure. In particular embodiments, as shown in FIG. 9, flex portion 518 comprises a first beam 520 and a second beam 522. Contact portion 516 includes a first contact portion 516' and a second contact portion 516" in contact with the inner surface 128 of the seal carrier 102. Contact portions 516', 516" of the flex body 514 are in contact with the inner surface 128 of the seal carrier 102. Contact portions 516', 516" may be rigidly connected to or slidably contacting the inner surface 128 of the seal carrier 102. First beam 520 extends toward the rotor shaft 106 at an angle that is tangent to the outer surface 104 of the rotor shaft 106. Second beam 522 extends towards the rotor shaft 106 at an angle that is tangent to the outer surface 104 of the rotor shaft 106. First beam 520 and second beam 522 extend in circumferentially opposite directions with respect to circumferential direction C.

The damping system 126 is disposed between the inner surface 128 of the seal carrier 102 and the seal member 110. In this embodiment, flex body 514 may be oriented axially with respect to axial direction A which is parallel to the axial centerline 112 of the rotor shaft 106 (FIG. 3), or in the alternative, may be circumferentially oriented about the outer surface 104 of the rotor shaft 106.

In various embodiments, as shown in FIG. 9, the flex body 514 may include one or more cutouts or flex joints 544 which reduce stiffness at a respective joint of the flex body 514. The flex joints 544 may be formed at various locations along the flex body 514, such as but not limited to, a joint or joints formed between first beam 520 and the first contact portion 516', the second beam 522 and the second contact portion 516", between first beam 520 and the second beam 522, between the first beam 520 and the seal member 110, and the second beam 522 and the seal member 110. It is to be appreciated that flex joints 544 as illustrated in FIG. 9 may also be integrated on any of the embodiments shown in FIGS. 3-8.

Figure 10:
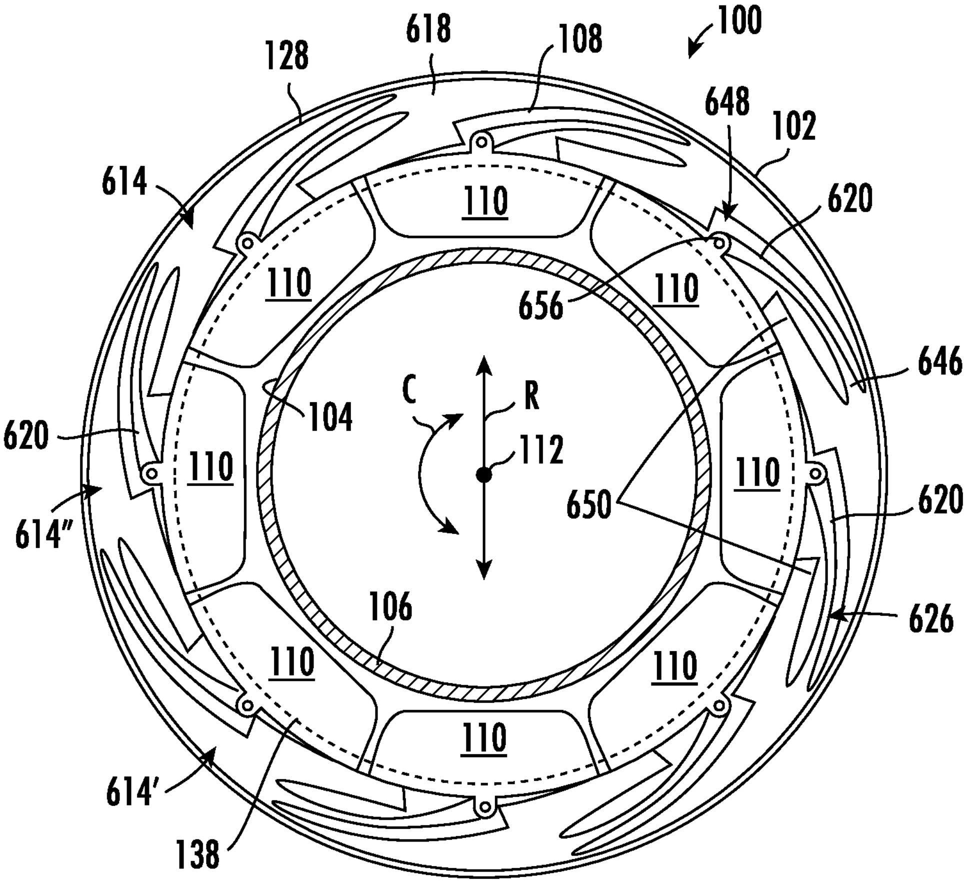
FIG. 10 is a cross-sectioned schematic view of a portion of a seal member support system including a seal carrier and an exemplary flex body in accordance with an exemplary aspect of the present disclosure.

FIG. 10 provides a cross-sectioned schematic view of the support system 100 including the seal carrier 102 and including an exemplary flex body 614 in accordance with various embodiments of the present disclosure. In particular embodiments, as shown in FIG. 10, flex body 614 is formed as an annular ring. The flex body 614 may be formed as a singular/unitary body or formed from two or more flex body segments 614', 614" which form an annular ring about the rotor shaft 106. The flex body 614 is disposed radially outward from the seal member(s) 110 with respect to the axial centerline 112 of the rotor shaft 106. In exemplary embodiments, the support system 100 further comprises a garter spring 138. The garter spring 138 couples the plurality of seal members 110 in a circumferential pattern with respect to circumferential direction C about the axial centerline 112 of the rotor shaft 106.

As shown in FIG. 10, the flex body 614 includes a flex portion 618 comprising a plurality of beams 620 extending tangentially in both circumferential direction C and radial direction R with respect to the axial centerline 112 of the rotor shaft 106. Each beam 620 of the plurality of beams 620 is connected at a first end 646 in a cantilever manner to a contact portion 616 of the flex body 614. The contact portion 616 of the flex body 614 is in contact with the inner surface 128 of the seal carrier 102. Contact portion 616 may be rigidly connected to or slidably contacting the inner surface 128 of the seal carrier 102.

A second end 648 of the beam 620 is connected to a respective seal member 110. The support system 100 further includes a damping system 626. The damping system 626 includes a plurality of dampers or deflection limiters 650 that extend outward along the radial direction towards the carrier to contact the carrier when the seal member moves outward along the radial direction. Each deflection limiter 650 of the plurality of deflection limiters 650 is configured to slow or stop radially outward motion of the seal member 110 such as when the flex portion 618 or beam 620 begins to retract as the pressure inside the pressure chamber 108 returns to a level at or below the minimum pressure threshold value P1 or when the seal member 110 is forced radially outwardly due to rotor shaft vibrations or a sudden surge in pressure between the outer surface 104 of the rotor shaft 106 and the seal member 110. This damping effect reduces the potential for damage to the seal member 110.

Figure 11:
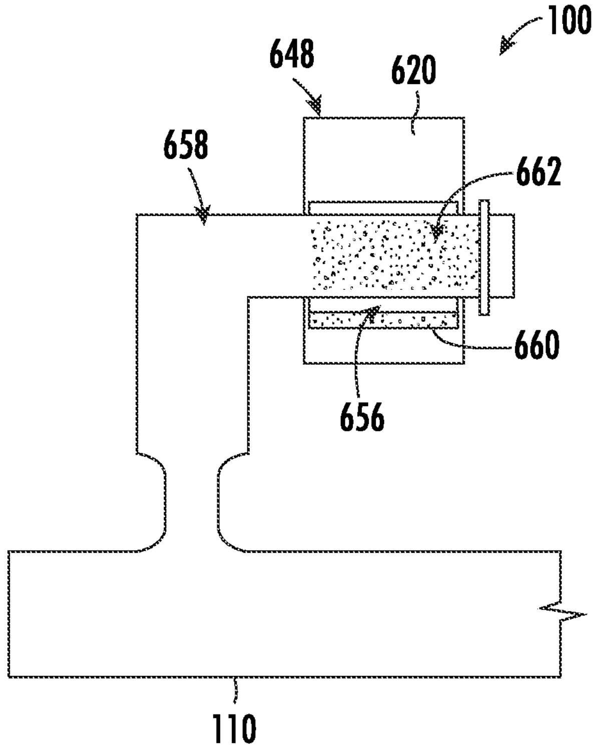
FIG. 11 is a schematic view of a portion of the seal member support system as shown in FIG. 10 including a portion of a beam and a portion of a seal member in accordance with an exemplary aspect of the present disclosure.

FIG. 11 provides a cross-sectioned schematic side view of a portion of the turbomachine 26 of the gas turbine engine 20 shown in FIG. 2, according to exemplary embodiments of the present disclosure. FIG. 11 may be a representative cross-section of any of the LP compressor 32, the HP compressor 34, the HP turbine 38, or the LP turbine 40. As shown in FIGS. 10 and 11 collectively, each beam 620 includes a hole or aperture 656 defined at or proximate to the second end 648 of the flex portion 618. As shown in FIG. 11, each seal member 110 is coupled to the flex portion 618 via a respective beam 620 and a shaft or pin 658 that extends through the respective hole or aperture 656. In various embodiments, one or both of aperture 656 and pin 658 is coated with a friction reduction coating 660 and/or friction reduction coating 662 respectively.

Figure 12:
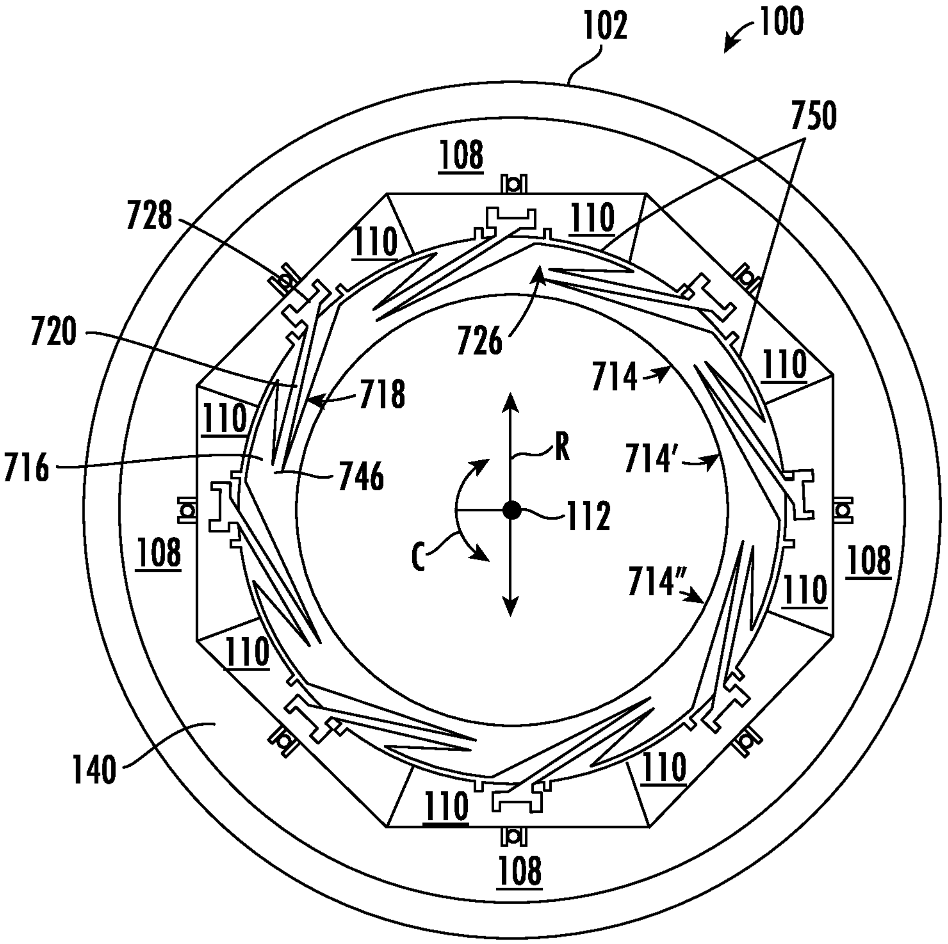
FIG. 12 is a cross-sectioned schematic view of a portion of a seal member support system in accordance with an exemplary aspect of the present disclosure.

FIG. 12 provides a cross-sectioned schematic view of the support system 100 including the seal carrier 102 and an exemplary flex body 714 in accordance with various embodiments of the present disclosure. In particular embodiments, as shown in FIG. 12, flex body 714 is formed as an annular ring. The flex body 714 may be formed as a singular body or formed from two or more flex body segments 714', 714" which form an annular ring about the rotor shaft 106 (omitted from FIG. 12 for clarity). The flex body 714 is disposed radially inward from the seal member(s) 110 with respect to radial direction R and the axial centerline 112 of the rotor shaft 106.

The flex body 714 includes a flex portion 718 comprising a plurality of beams 720 extending tangentially to the rotor shaft in both circumferential direction C and radial direction R with respect to the axial centerline 112 of the rotor shaft 106. Each beam 720 of the plurality of beams 720 is connected at a first end 746 in a cantilever manner to a contact portion 716 of the flex body 714. In exemplary embodiments, the contact portion 716 of the flex body 714 is connected to a side wall 140 of the seal carrier 102. The contact portion 716 of the flex body 714 may be connected to the side wall 140 of the seal carrier 102 via a pin or other suitable fastener or fasteners.

A second end 728 of each beam 720 is connected to a respective seal member 110. The support system 100 further includes a damping system 726. The damping system 726 includes a plurality of dampers or deflection limiters 750 configured to slow or dampen radially inward motion of the respective seal member 110 such as when the seal member 110 is suddenly forced radially inwardly due to a surge in pressure in the pressure chamber 108. This damping effect reduces the potential for rotor scrub or rub between the seal member(s) 110 and the outer surface 104 of the rotor shaft 106 which may result in damage to or undesired wear of the seal member 110.

The seal member support system holds the seal members in a retracted position radially away from the rotor shaft during low delta pressure operating conditions. The various embodiments presented herein work on a tangential spring-based retraction mechanism. In an assembly or low-pressure condition, the seal members are held in the retracted position, radially outward from the outer surface of the rotor shaft. As a pressure delta across a backside surface of the seal members increases, the seal members/segments move radially inwardly to a desired radial position to seal the respective radial gap (e.g. the seal rides on an air film). As the pressure delta across the seal members decreases, the seal members return to the retracted condition, thus reducing the potential for rotor scrub and damage or excessive wear to the seal members.

This written description uses examples to disclose the present disclosure, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A turbomachine, comprising: a rotor shaft having an outer surface and an axial centerline; a seal member support system, comprising: a seal carrier forming an annulus about the rotor shaft, wherein the seal carrier at least partially defines a pressure chamber; a seal member; and a flex body having a contact portion in contact with the seal carrier, and a flex portion extending from the contact portion towards the outer surface of the rotor shaft, wherein the flex portion is coupled to the seal member. The flex portion defines a resistance along a radial direction of the turbomachine and is configured to hold the seal member at a radial distance away from the outer surface of the rotor shaft when a pressure inside the pressure chamber is equal to or below a minimum pressure threshold value, and to flex and move the seal member towards the outer surface of the rotor when the pressure inside the pressure chamber exceeds the minimum pressure threshold value.

The turbomachine of the preceding clause, wherein the flex portion is oriented axially with respect to the axial centerline of the rotor shaft.

The turbomachine of the preceding clause, wherein the flex portion is oriented in a circumferential direction with respect to the axial centerline of the rotor shaft.

The turbomachine of the preceding clause, wherein the flex portion comprises a single beam extending from the contact portion to the seal member.

The turbomachine of any preceding clause, wherein the flex portion comprises a first beam and a second beam, wherein the first beam and the second beam are arranged as a first wishbone flex member.

The turbomachine of any preceding clause, wherein the flex portion further comprises a third beam and a fourth beam arranged as a second wishbone flex member.

The turbomachine of any preceding clause, wherein the first wishbone flex member and the second wishbone member are radially stacked between the seal member and the seal carrier in a radial direction with respect to the axial centerline of the rotor shaft.

The turbomachine of any preceding clause, wherein the flex portion comprises a first beam and a second beam, and wherein the contact portion includes a first contact portion and a second contact portion, wherein the first beam extends from the first contact portion to the seal member and the second beam extends from the second contact portion to the seal member.

The turbomachine of any preceding clause, wherein the seal member support system further comprises a garter spring, and the seal member includes a plurality of seal members, wherein the garter spring couples the seal members of the plurality of seal members in a circumferential pattern about the axial centerline of the rotor shaft.

The turbomachine of any preceding clause, wherein the flex body includes one or more flex joints.

The turbomachine of any preceding clause, wherein the flex body is formed as an annular ring.

The turbomachine of any preceding clause, wherein the flex body defines a plurality of deflection limiters, wherein the plurality of deflection limiters extend outward along the radial direction towards the carrier to contact the carrier when the seal member moves outward along the radial direction.

The turbomachine of any preceding clause, wherein the flex portion of the flex body defines an aperture, wherein the seal member is coupled to the flex portion via a pin that extends through the aperture.

The turbomachine of any preceding clause, wherein one or both of the aperture and the pin is coated with a friction reducing coating.

The turbomachine of any preceding clause, wherein the annular ring is formed from a plurality of ring segments.

The turbomachine of any preceding clause, wherein the flex body is disposed radially outward from the seal member with respect to the axial centerline of the rotor shaft.

The turbomachine of any preceding clause, wherein the contact portion of the flex body is in contact with an inner surface of the seal carrier.

The turbomachine of any preceding clause, wherein the flex body is disposed radially inward from the seal member with respect to the axial centerline of the rotor shaft.

The turbomachine of any preceding clause, wherein the contact portion of the flex body is connected to a side wall of the seal carrier.

The turbomachine of any preceding clause, wherein the flex portion extends radially outwardly from the contact portion.

The turbomachine of any preceding clause, wherein the seal member support system further comprises a damping system.

The turbomachine of any preceding clause, wherein the seal carrier includes an inner surface, and wherein the damping system is disposed between the inner surface of the seal carrier and the seal member.

The turbomachine of any preceding clause, wherein the damping system is disposed between the contact portion and the seal member.

The turbomachine of any preceding clause, wherein the damping system comprises a spring, wherein the spring is configured to slow radially outward motion of the seal member.

The turbomachine of any preceding clause, wherein the damping system includes a stopper.

The turbomachine of any preceding clause, wherein the damping system includes a bi-metallic stopper.

The turbomachine of any preceding clause, wherein the damping system includes a first damping system and a second damping system, wherein the first damping system and the second damping system are radially stacked with respect to the axial centerline of the rotor shaft between the seal member and the seal carrier.

The turbomachine of any preceding clause, wherein the first damping system provides a first stiffness, and the second damping system provides a second stiffnesses.

A seal member support system for a gas turbine engine, the seal member support system comprising: a seal carrier forming an annulus about a rotor shaft, wherein the seal carrier at least partially defines a pressure chamber; a seal member; and a flex body having a contact portion in contact with the seal carrier, and a flex portion extending from the contact portion towards an outer surface of the rotor shaft, wherein the flex portion is coupled to the seal member. The flex portion defines a resistance along a radial direction of the turbomachine and is configured to hold the seal member at a radial distance away from the outer surface of the rotor shaft when a pressure inside the pressure chamber is equal to or below a minimum pressure threshold value, and to flex and move the seal member towards the outer surface of the rotor when the pressure inside the pressure chamber exceeds the minimum pressure threshold value.

The seal member support system of the preceding clause, wherein the flex portion is oriented axially with respect to the axial centerline of the rotor shaft.

The seal member support system of any preceding clause, wherein the flex portion is oriented in a circumferential direction with respect to the axial centerline of the rotor shaft.

The seal member support system of any preceding clause, wherein the flex portion comprises a single beam extending from the contact portion to the seal member.

The seal member support system of any preceding clause, wherein the flex portion comprises a first beam and a second beam, wherein the first beam and the second beam are arranged as a first wishbone flex member.

The seal member support system of any preceding clause, wherein the flex portion further comprises a third beam and a fourth beam arranged as a second wishbone flex member.

The seal member support system of any preceding clause, wherein the first wishbone flex member and the second wishbone member are radially stacked between the seal member and the seal carrier in a radial direction with respect to the axial centerline of the rotor shaft.

The seal member support system of any preceding clause, wherein the flex portion comprises a first beam and a second beam, and wherein the contact portion includes a first contact portion and a second contact portion, wherein the first beam extends from the first contact portion to the seal member and the second beam extends from the second contact portion to the seal member.

The seal member support system of any preceding clause, wherein the seal member support system further comprises a garter spring, and the seal member includes a plurality of seal members, wherein the garter spring couples the seal members of the plurality of seal members in a circumferential pattern about the axial centerline of the rotor shaft.

The seal member support system of any preceding clause, wherein the flex body includes one or more flex joints.

The seal member support system of any preceding clause, wherein the flex body is formed as an annular ring.

The seal member support system of any preceding clause, wherein the flex body defines a plurality of deflection limiters, wherein the plurality of deflection limiters extends outward along the radial direction towards the carrier to contact the carrier when the seal member moves outward along the radial direction.

The seal member support system of any preceding clause, wherein the flex portion of the flex body defines an aperture, wherein the seal member is coupled to the flex portion via a pin that extends through the aperture.

The seal member support system of any preceding clause, wherein one or both of the aperture and the pin is coated with a friction reducing coating.

The seal member support system of any preceding clause, wherein the annular ring is formed from a plurality of ring segments.

The seal member support system of any preceding clause, wherein the flex body is disposed radially outward from the seal member with respect to the axial centerline of the rotor shaft.

The seal member support system of any preceding clause, wherein the contact portion of the flex body is in contact with an inner surface of the seal carrier.

The seal member support system of any preceding clause, wherein the flex body is disposed radially inward from the seal member with respect to the axial centerline of the rotor shaft.

The seal member support system of any preceding clause, wherein the contact portion of the flex body is connected to a side wall of the seal carrier.

The seal member support system of any preceding clause, wherein the flex portion extends radially outwardly from the contact portion.

The seal member support system of any preceding clause, wherein the seal member support system further comprises a damping system.

The seal member support system of any preceding clause, wherein the seal carrier includes an inner surface, and wherein the damping system is disposed between the inner surface of the seal carrier and the seal member.

The seal member support system of any preceding clause, wherein the damping system is disposed between the contact portion and the seal member.

The seal member support system of any preceding clause, wherein the damping system comprises a spring, wherein the spring is configured to slow radially outward motion of the seal member.

The seal member support system of any preceding clause, wherein the damping system includes a stopper.

The seal member support system of any preceding clause, wherein the damping system includes a bi-metallic stopper.

The seal member support system of any preceding clause, wherein the damping system includes a first damping system and a second damping system, wherein the first damping system and the second damping system are radially stacked with respect to the axial centerline of the rotor shaft between the seal member and the seal carrier.

The seal member support system of any preceding clause, wherein the first damping system provides a first stiffness, and the second damping system provides a second stiffnesses.

We claim:

1. A turbomachine, comprising:

a rotor shaft having an outer surface and defining an axial centerline;

a seal member support system, comprising:

a seal carrier forming an annulus about the rotor shaft, wherein the seal carrier at least partially defines a pressure chamber;

a seal member; and a flex body having a contact portion in contact with the seal carrier, and a flex portion extending from the contact portion towards the outer surface of the rotor shaft, wherein the flex portion is coupled to the seal member;

wherein the flex portion defines a resistance along a radial direction of the turbomachine and holds the seal member at a radial distance away from the outer surface of the rotor shaft when a pressure inside the pressure chamber is equal to or below a minimum pressure threshold value, and to flex and move the seal member towards the outer surface of the rotor shaft when the pressure inside the pressure chamber exceeds the minimum pressure threshold value;

wherein the seal member support system further comprises a damping system including a stopper and a piston coupled to the stopper, wherein the seal carrier includes an inner surface, and wherein the stopper and the piston is disposed between the inner surface of the seal carrier and the seal member.

2. The turbomachine of claim 1, wherein the flex portion is oriented axially with respect to the axial centerline of the rotor shaft.

3. The turbomachine of claim 1, wherein the flex portion is oriented in a circumferential direction with respect to the axial centerline of the rotor shaft.

4. The turbomachine of claim 1, wherein the flex portion comprises a single beam extending from the contact portion to the seal member.

5. The turbomachine of claim 1, wherein the flex portion comprises a first beam and a second beam, wherein the first beam and the second beam are arranged as a first wishbone flex member.

6. The turbomachine of claim 5, wherein the flex portion further comprises a third beam and a fourth beam arranged as a second wishbone flex member.

7. The turbomachine of claim 6, wherein the first wishbone flex member and the second wishbone flex member are radially stacked between the seal member and the seal carrier in the radial direction with respect to the axial centerline of the rotor shaft.

8. The turbomachine of claim 1, wherein the flex portion comprises a first beam and a second beam, and wherein the contact portion includes a first contact portion and a second contact portion, wherein the first beam extends from the first contact portion to the seal member and the second beam extends from the second contact portion to the seal member.

9. The turbomachine of claim 1, wherein the damping system further comprises a spring supported by the stopper.

10. The turbomachine of claim 1, wherein the flex body includes one or more flex joints.

11. A turbomachine, comprising:

a rotor shaft having an outer surface and defining an axial centerline;

a seal member support system, comprising:

a seal carrier forming an annulus about the rotor shaft, wherein the seal carrier at least partially defines a pressure chamber;

a seal member; and a flex body having a contact portion in contact with the seal carrier, and a flex portion extending from the contact portion towards the outer surface of the rotor shaft, wherein the flex portion is coupled to the seal member;

wherein the flex portion defines a resistance along a radial direction of the turbomachine and holds the seal member at a radial distance away from the outer surface of the rotor shaft when a pressure inside the pressure chamber is equal to or below a minimum pressure threshold value, and to flex and move the seal member towards the outer surface of the rotor shaft when the pressure inside the pressure chamber exceeds the minimum pressure threshold value;

wherein the seal member support system further comprises a garter spring, and the seal member includes a plurality of seal members, wherein the garter spring couples the plurality of seal members of the plurality of seal members in a circumferential pattern about the axial centerline of the rotor shaft.

12. The turbomachine of claim 11, wherein the flex body is formed as an annular ring.

13. The turbomachine of claim 12, wherein the flex body defines a plurality of deflection limiters, wherein the plurality of deflection limiters extend outward along the radial direction towards the seal carrier to contact the seal carrier when the seal member moves outward along the radial direction.

14. The turbomachine of claim 12, wherein the flex portion of the flex body defines an aperture, wherein the seal member is coupled to the flex portion via a pin that extends through the aperture.

15. The turbomachine of claim 14, wherein one or both of the aperture and the pin is coated with a friction reducing coating.

16. The turbomachine of claim 12, wherein the annular ring comprises a plurality of ring segments.

17. The turbomachine of claim 12, wherein the flex body is disposed radially outward from the seal member with respect to the axial centerline of the rotor shaft.

18. The turbomachine of claim 17, wherein the contact portion of the flex body is in contact with an inner surface of the seal carrier.

19. The turbomachine of claim 12, wherein the flex body is disposed radially inward from the seal member with respect to the axial centerline of the rotor shaft, wherein the contact portion of the flex body is connected to a side wall of the seal carrier, and wherein the flex portion extends radially outwardly from the contact portion.

* * * * *